United States Patent
Liu et al.

(10) Patent No.: US 8,448,470 B2
(45) Date of Patent: May 28, 2013

(54) METHOD FOR MANUFACTURING CURVED GLASS SHEET AND MOLD EMPLOYED IN THE SAME

(75) Inventors: Shyan-Juh Liu, Tu-Cheng (TW); Chu-Sheng Chen, Tu-Cheng (TW); Lai-Bing Huang, Shenzhen (CN); Ren-Jun Yang, Shenzhen (CN); Lei Liu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 20 days.

(21) Appl. No.: 13/069,402

(22) Filed: Mar. 23, 2011

(65) Prior Publication Data
US 2012/0144866 A1  Jun. 14, 2012

(30) Foreign Application Priority Data
Dec. 11, 2010 (CN) .......................... 2010 1 0583507

(51) Int. Cl.
*C03B 23/03* (2006.01)
(52) U.S. Cl.
CPC ......... *C03B 23/0302* (2013.01); *C03B 23/0307* (2013.01)
USPC .......................................... 65/106; 65/29.19
(58) Field of Classification Search
CPC ....................................................... C03B 23/03
USPC ................................ 65/29.19, 106, 287, 319
See application file for complete search history.

(56) References Cited

U.S. PATENT DOCUMENTS

| | | | | |
|---|---|---|---|---|
| 3,459,521 A | * | 8/1969 | Nedelec | 65/25.4 |
| 4,671,814 A | * | 6/1987 | Aratani et al. | 65/30.14 |
| 4,737,182 A | * | 4/1988 | Fecik et al. | 65/106 |
| 5,045,507 A | * | 9/1991 | Tran | 501/40 |
| 6,067,819 A | * | 5/2000 | Tanaka et al. | 65/26 |
| 2008/0206494 A1 | * | 8/2008 | Kurachi et al. | 428/1.62 |
| 2010/0112341 A1 | * | 5/2010 | Takagi et al. | 428/336 |

FOREIGN PATENT DOCUMENTS

JP  2001310385 A  * 11/2001

* cited by examiner

*Primary Examiner* — Christina Johnson
*Assistant Examiner* — Cynthia Szewczyk
(74) *Attorney, Agent, or Firm* — Altis Law Group, Inc.

(57) ABSTRACT

A method for manufacturing curved glass sheet includes the following steps: providing a mold which includes a first mold core and a second mold core corresponding to the first mold core; providing a raw glass sheet and placing the raw glass sheet on the second mold core; heating the first mold core to a first temperature, and heating the second mold core and the raw glass sheet to a second temperature which is equal to or lower than the glass transition temperature of the glass sheet but higher than the first temperature; closing the mold and hot pressing the first mold core on the glass sheet; opening the mold, and cooling the glass sheet to obtain the curved glass sheet. An annealing step can also be provided to the curved glass sheet. A mold for manufacturing the curved glass sheet is also provided.

9 Claims, 8 Drawing Sheets

METHOD FOR MANUFACTURING CURVED GLASS SHEET AND MOLD EMPLOYED IN THE SAME

BACKGROUND

1. Technical Field

The present disclosure generally relates a method for manufacturing a curved glass sheet and a mold employed in the same.

2. Description of Related Art

Curved or bent glass sheets are commonly employed as glazing closures in vehicles such as automobiles. Such curved or bent glass sheets are conventionally generally produced by gravity bending methods. The commonly used method for manufacturing the curved or bent glass sheet includes the steps of gravity bending a glass sheet at elevated temperature on a gravity bending mold in a gravity bending zone of a furnace. Later, the gravity bent glass sheet is being press bent to a desired shape with an upper mold while the glass sheet is supported by the gravity bending mold as a lower mold in a press bending zone of the furnace. The ambient temperature in the press bending zone is thereby controlled to control the cooling rate of the glass sheet in the press bending zone.

However, in recent years, the developments in vehicle design have required curved or bent glass sheet of complex curvature and lower roughness. It is impossible to impart more than a very limited degree of complex curvature to a sheet of glass by gravity bending alone. Furthermore, the use of automated assembly by vehicle manufacturers demands that the glass meets tighter dimensional tolerances. The shape of the periphery of the bent glass pane must be accurate, not only in terms of its two dimensional projection, but also in three dimensions, i.e. the angle of the glass adjacent at the periphery must be correct. These requirements, in conjunction with the trend towards deeper and more complex bends, can no longer be met by glass that is bent by the gravity bending technique alone.

Therefore, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the method for manufacturing curved glass sheet and the mold employed in the same. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
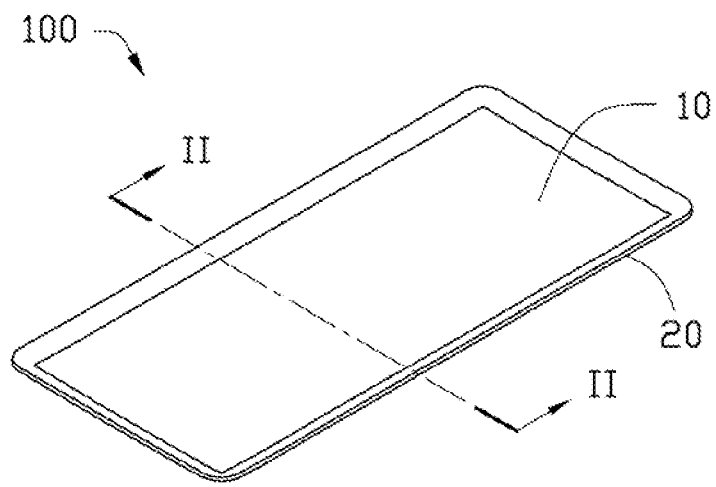
FIG. 1 shows an isometric view of a curved glass sheet.
Figure 2:
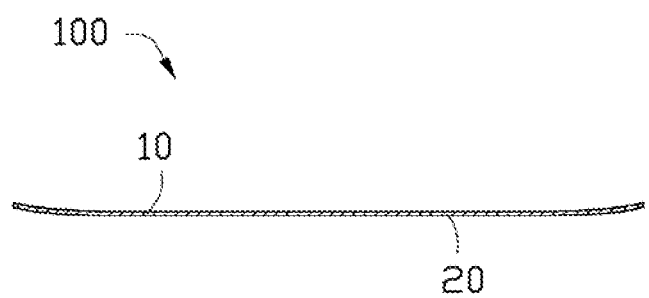
FIG. 2 shows a cross section of the curved glass sheet taken along line II-II of FIG. 1.

Referring to FIGS. 1 and 2, a curved glass sheet 100 is a substantially arc-shaped sheet, and includes an inner concave surface 10 and an outer convex surface 20 opposite to the inner concave surface 10.

Figure 3:
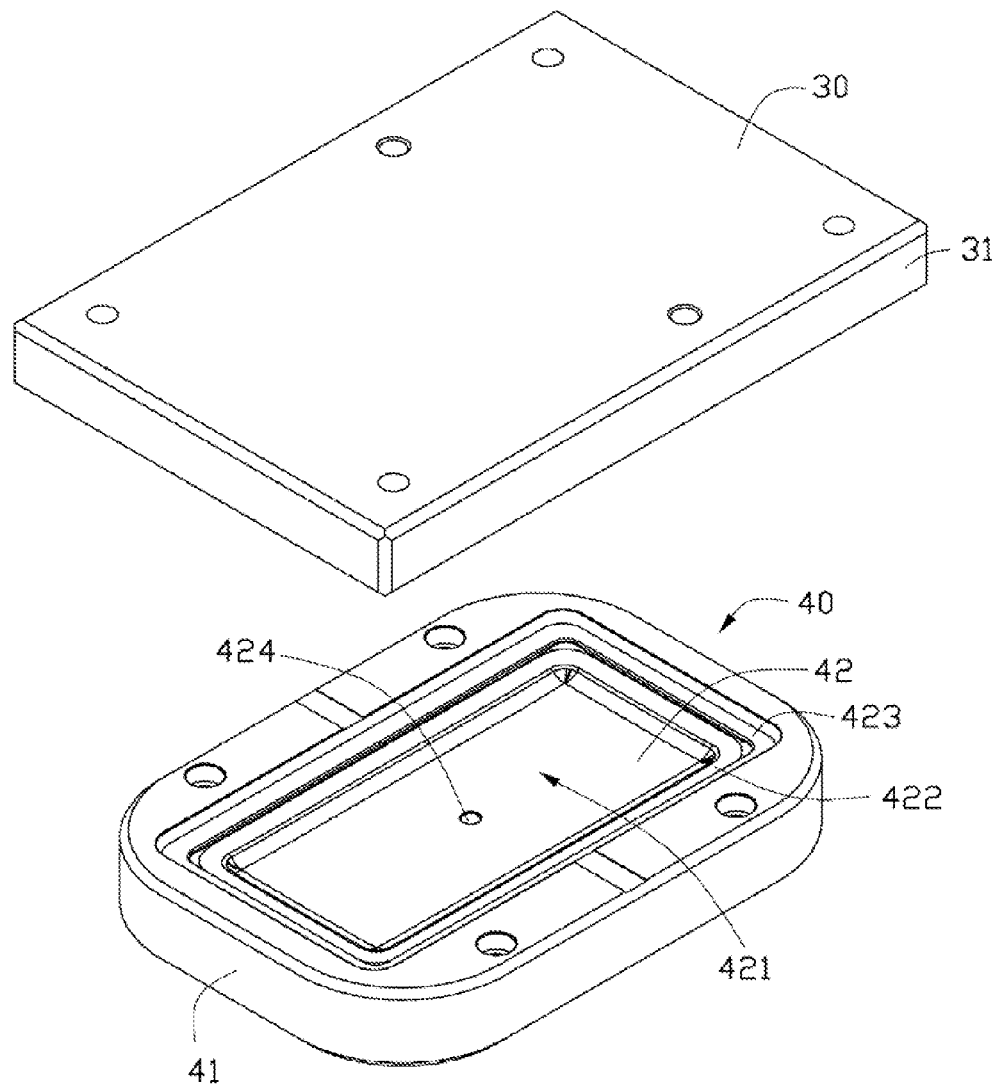
FIG. 3 shows an exploded isometric view of a mold for manufacturing the curved glass sheet, wherein the mold includes a first mold core and a second mold core.
Figure 4:
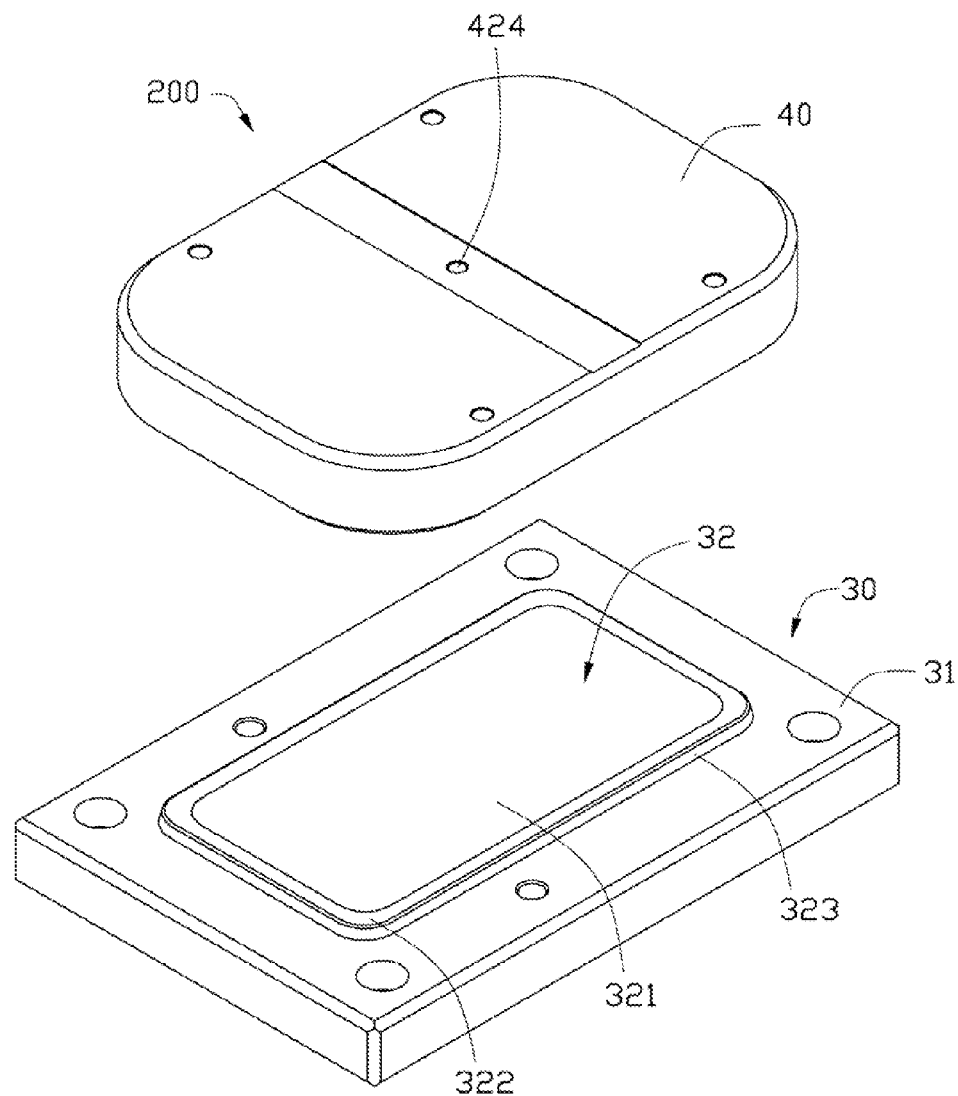
FIG. 4 is similar to FIG. 3, but viewed from another aspect.

Also referring to FIGS. 3 and 4, an embodiment of a mold 200 for manufacturing the curved glass sheet 100 includes a first mold core 30 and a second mold core 40 positioned opposite to and corresponding to the first mold core 30. In the illustrated embodiment, the first and second mold cores 30, 40 are made of boron nitride. The first mold core 30 includes a main body 31 and a mold pressing portion 32 formed on a bottom surface of the main body 31. The mold pressing portion 32 includes an upper cambered surface 321, a stepped surface 322 and a side surface 323. The upper cambered surface 321 is a convex curved surface with a shape substantially the same as that of the concave surface 10 of the curved glass sheet 100. The stepped surface 322 is a flat surface connecting with the peripheral edge of the upper cambered surface 321 and positioned surrounding the upper cambered surface 321. The side surface 323 connects with the stepped surface 322 and forms an angle bigger than 90 degrees with the stepped surface 322, such that, in assembly, the first mold core 30 could align and match with the second mold core 40 easily and quickly. In the illustrated embodiment, the side surface 323 forms an angle of 105 degrees with the stepped surface 322.

The second mold core 40 includes a base body 41. A mold cavity 42 is inner recessed from an upper surface of the second mold core 40 corresponding to the mold pressing portion 32 of the first mold core 30. The mold cavity 42 includes a base surface 421, a first step surface 422 smoothly and transitionally connecting with the base surface 421 and a second step surface 423, respectively. The base surface 421 is a substantially arc or curved shaped surface. The base surface 421 has a curvature slightly bigger than that of the upper cambered surface 321 of the first mold core 30. A predefined clearance is formed between the outer convex surface 20 of the curved glass sheet 100 and the base surface 421 during the manufacturing process of the curved glass sheet 100, to prevent the outer convex surface 20 contacting with the base surface 421. Thus, the roughness of the outer convex surface 20 of the curved glass sheet 100 can be improved. The first step surface 422 is a substantially arc or curved shaped surface and has a curvature substantially the same as that of the upper cambered surface 321 of the first mold core 30. The first step surface 422 is configured for receiving a raw glass sheet 300 during the manufacturing process of the curved glass sheet 100 (shown in FIGS. 5 and 6). The second step surface 423 is a flat surface configured for matching with the corresponding stepped surface 322 of the first mold core 30. The raw glass sheet 300 is flat-shaped and has a thickness substantially the same as that of the manufactured curved glass sheet 100. The base surface 421 further defines a vent hole 424 therethrough for exhausting the air within the mold cavity 42 of the second mold core 40 during the manufacturing process of the curved glass sheet 100, and balancing the inner pressure and outer pressure of the mold cavity 42.

Figure 5:
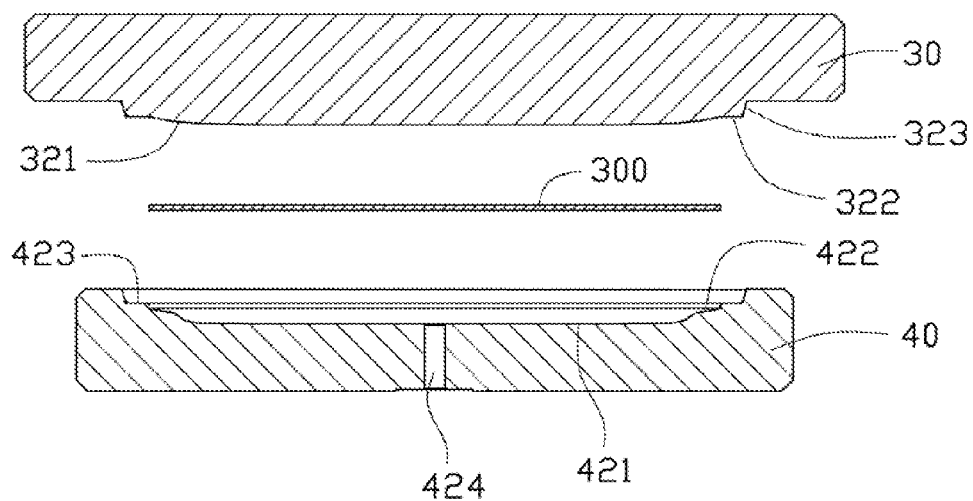
FIG. 5 shows a cross section of the mold, wherein a raw glass sheet is put into the mold.
Figure 6:
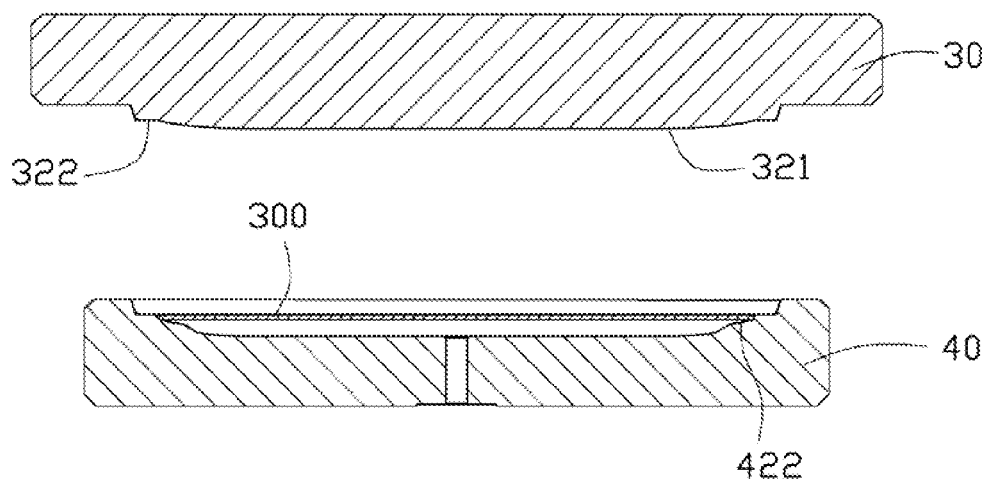
FIG. 6 is similar to FIG. 5, wherein the raw glass sheet is put into the second mold core.
Figure 7:
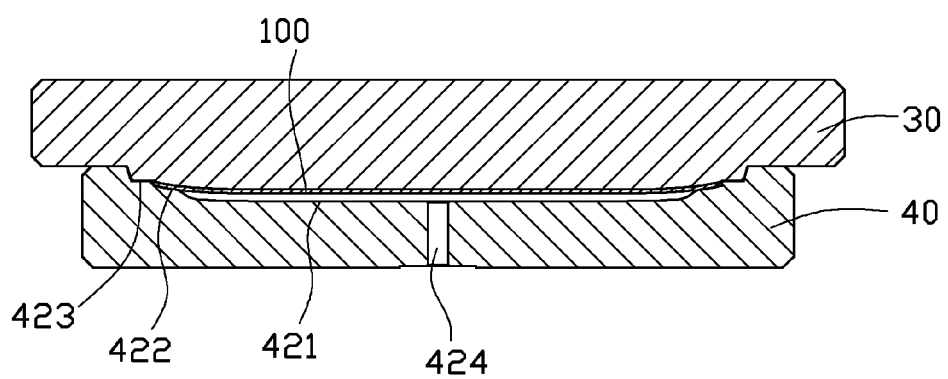
FIG. 7 shows a cross section of the mold, showing the curved glass sheet being formed within the mold.
Figure 8:
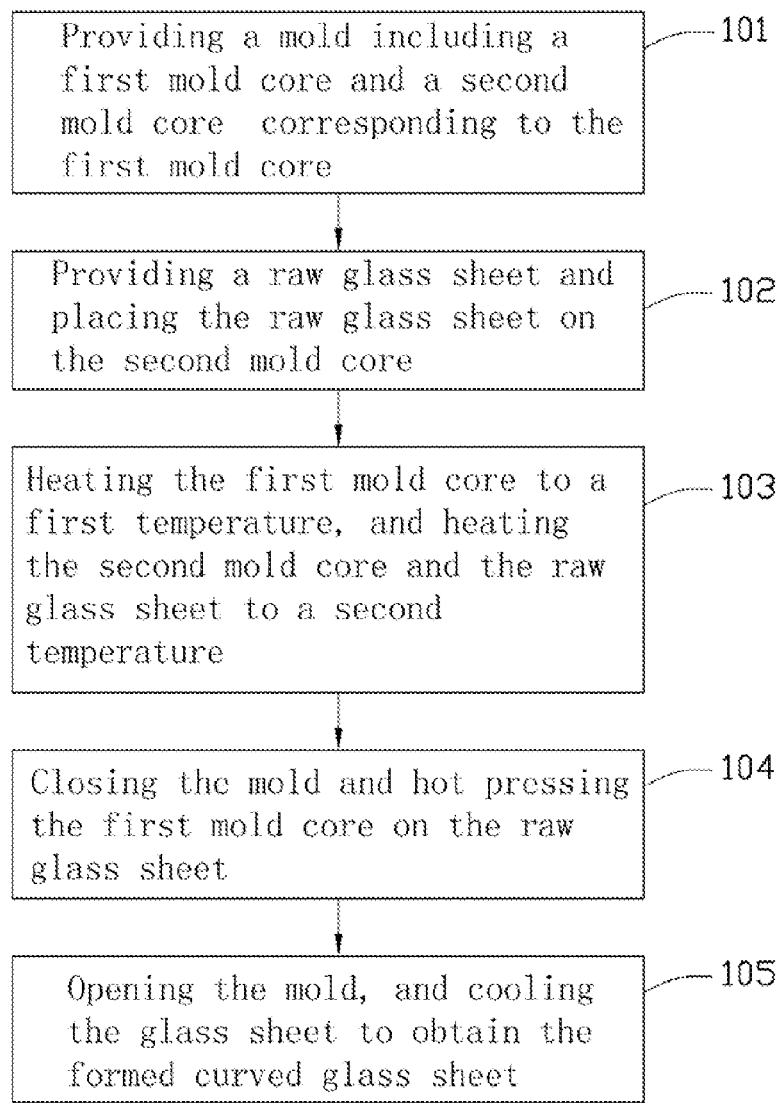
FIG. 8 is a flow chart for showing a method for manufacturing the curved glass sheet.

Referring to FIG. 5 though 8 a method for manufacturing the curved glass sheet 100 is illustrated as follows.

In step 101, a mold 200 including a first mold core 30 and a second mold core 40 corresponding to the first mold core 30 is provided.

In step 102: a raw glass sheet 300 is provided and placed on the second mold core 40.

In step 103: the first mold core 30 is heated to a first temperature T1, the second mold core 40 and the raw glass sheet 300 are both heated to a second temperature T2. The second temperature T2 is equal to or lower than a glass transition temperature of the raw glass sheet 300, but higher than the first temperature T1 of the first mold core 30. In this embodiment, the temperature difference between the second temperature T2 and the glass transition temperature of the glass sheet 300 is substantially 0~100 degrees Celsius. The temperature difference between the first temperature T1 and the second temperature T2 is substantially 100~250 degrees Celsius. In the illustrated embodiment, the first mold core 30 and the second mold core 40 are both heated via electromagnetic induction heating method.

In step 104: the mold 200 is closed, and the raw glass sheet 300 is hot pressed by the first mold core 30.

In step 105: the mold 200 is opened, and the glass sheet is cooled down to obtain the formed curved glass sheet 100.

It is to be understood that the method for manufacturing the curved glass sheet 100 can further include an annealing step to the curved glass sheet 100 after the step 105, for relieving the internal stress of the curved glass sheet 100.

In the illustrated embodiment, the raw glass sheet 300 is aluminosilicate glass, the glass transition temperature of the raw glass sheet 300 is 850 degrees Celsius, the first temperature T1 is preferably controlled at 600~650 degrees Celsius. The second temperature T2 is preferably controlled at 750~850 degrees Celsius to ensure a viscosity of the raw glass sheet 300 is $10^{6.8}$-$10^{9.8}$ Pa·s.

Referring to the following table 1, which shows the test data of the raw glass sheet 300 made from aluminosilicate glass formed at different forming temperatures, in which the surface roughness Ra is measured via a 3D optical profile measuring instrument. The profile deviation is measured via an automatic image testing machine, namely an average of the profile deviations of the inner concave surface 10 and the outer convex surface 20 of the curved glass sheet 100.

of the inner concave surface 10 of the finally formed curved glass sheet 100 is ranged from 0.08-0.50 μm. The roughness of the outer convex surface 20 is ranged from 0.04-0.45 μm, the profile deviation thereof is in the ranged of 0.06-0.12 mm.

During the manufacturing process of the curved glass sheet 100, the higher the forming temperature is, the easier it is for impurities (such as air, dust, oxide) to form on the surface of the mold 200 and enter into the curved glass sheet 100, thus, the roughness of the curved glass sheet 100 is increased. Therefore, controlling the second temperature T2 of the second mold core 40 and ensuring that the second temperature T2 is equal to or lower than the glass transition temperature of the raw glass sheet 300 reduces the roughness of the finally formed curved glass sheet 100. In addition, ensuring the temperature difference between the second temperature T2 and the glass transition temperature of the glass sheet 300 at substantially 0~100 degrees Celsius controls the viscosity of the raw glass sheet 300 at $10^{6.8}$-$10^{9.8}$ Pa·s and further reduces the profile deviation.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A method for manufacturing curved glass sheet, comprising steps as follows:

providing a mold including a first mold core and a second mold core corresponding to the first mold core, the first mold core having an upper cambered surface, the second mold core having a mold cavity, the mold cavity is inner recessed corresponding to the upper cambered surface;

providing a raw glass sheet and placing the raw glass sheet on the second mold core;

TABLE 1

Test data of the curved glass sheet formed at different forming temperatures

| Serial number | Temperature of the first mold core T1 (° C.) | Temperature of the second mold core T1 (° C.) | Thickness of the raw glass sheet (mm) | Profile deviation (mm) | Roughness of the inner concave surface Ra (μm) | Roughness of the outer convex surface Ra (μm) |
|---|---|---|---|---|---|---|
| 1 | 600 | 750 | 0.8 | 0.11 | 0.08 | 0.04 |
| 2 | 620 | 780 | 1.0 | 0.10 | 0.11 | 0.09 |
| 3 | 640 | 800 | 1.3 | 0.09 | 0.16 | 0.15 |
| 4 | 650 | 850 | 1.5 | 0.06 | 0.50 | 0.45 |
| 5 | 600 | 850 | 2.0 | 0.07 | 0.28 | 0.25 |
| 6 | 620 | 800 | 2.5 | 0.08 | 0.13 | 0.1 |
| 7 | 640 | 780 | 1.5 | 0.10 | 0.12 | 0.08 |
| 8 | 650 | 750 | 2.5 | 0.12 | 0.09 | 0.05 |
| 9 | 700 | 890 | 1.0 | 0.06 | 3.05 | 2.5 |
| 10 | 680 | 930 | 1.0 | 0.05 | 3.58 | 2.45 |
| 11 | 730 | 950 | 1.0 | 0.05 | 5.27 | 3.86 |
| 12 | 680 | 950 | 2.0 | 0.05 | 5.38 | 4.03 |
| 13 | 730 | 930 | 2.0 | 0.06 | 4.12 | 3.56 |
| 14 | 700 | 890 | 2.0 | 0.07 | 2.95 | 2.29 |
| 15 | 550 | 700 | 1.0 | Broken | Untested | Untested |
| 16 | 530 | 680 | 1.0 | Broken | Untested | Untested |
| 17 | 500 | 730 | 1.0 | Broken | Untested | Untested |
| 18 | 550 | 700 | 2.0 | Broken | Untested | Untested測 |
| 19 | 530 | 680 | 2.0 | Broken | Untested | Untested |
| 20 | 500 | 730 | 2.0 | Broken | Untested | Untested |

As shown from Table 1, when the thickness of the raw glass sheet 300 is chosen in the range of 0.8~2.5 mm, the roughness heating the first mold core to a first temperature, heating the second mold core and the raw glass sheet to a second temperature, the second temperature being lower than the glass transition temperature of the glass sheet, and higher than the first temperature;

closing the mold and hot pressing the first mold core on the glass sheet; and opening the mold, and cooling the glass sheet to obtain the curved glass sheet.

2. The method for manufacturing the curved glass sheet of claim 1, wherein the temperature difference between the second temperature and the glass transition temperature of the glass sheet is substantially 1~100 degrees Celsius.

3. The method for manufacturing the curved glass sheet of claim 2, wherein the temperature difference between the first temperature and the second temperature is substantially 100~250 degrees Celsius.

4. The method for manufacturing the curved glass sheet of claim 3, wherein the first mold core comprises a main body and a mold pressing portion formed on a bottom surface of the main body; the upper cambered surface is a convex curved surface formed on the mold pressing portion; the second mold core comprises a base body, the mold cavity is recessed from an upper surface of the second mold core corresponding to the mold pressing portion of the first mold core.

5. The method for manufacturing the curved glass sheet of claim 4, wherein the mold pressing portion further comprises a stepped surface connecting with the peripheral edge of the upper cambered surface and positioned surrounding the upper cambered surface; the mold cavity comprises a base surface, a first step surface smoothly and transitionally connecting with the base surface, and a second step surface; the base surface has a curvature slightly bigger than that of the upper cambered surface of the first mold core, such that, a predefined clearance is formed between the outer convex surface of the curved glass sheet and the base surface during the manufacturing process of the curved glass sheet, to prevent the outer convex surface contacting with the base surface.

6. The method for manufacturing the curved glass sheet of claim 5, wherein the mold pressing portion further comprises a side surface connecting with the stepped surface and forming an angle bigger than 90 degrees with the stepped surface.

7. The method for manufacturing the curved glass sheet of claim 1, wherein the first mold core and the second mold core are both heated via electromagnetic induction heating method.

8. The method for manufacturing the curved glass sheet of claim 1, further comprising an annealing step after opening the mold, for relieving an internal stress of the curved glass sheet.

9. The method for manufacturing the curved glass sheet of claim 8, wherein the raw glass sheet is aluminosilicate glass, the first temperature is controlled at 600~650 degrees Celsius, and the second temperature is controlled at 750~849 degrees Celsius.

\* \* \* \* \*